United States Patent [19]

Mann et al.

[11] 4,161,010
[45] Jul. 10, 1979

[54] COMMUTATION SENSOR CIRCUIT FOR A DC-TO-DC SILICON CONTROLLED RECTIFIER (SCR) CHOPPER CIRCUIT

[75] Inventors: Stanley L. Mann, New Berlin; Charles E. Rettig, Brookfield, both of Wis.

[73] Assignee: Litton Industrial Products, Inc., Milwaukee, Wis.

[21] Appl. No.: 833,537

[22] Filed: Sep. 15, 1977

[51] Int. Cl.$^2$ ............................................. H02H 3/28
[52] U.S. Cl. ................................ 361/79; 307/252 M; 323/22 SC; 361/100; 363/54; 363/124; 363/138
[58] Field of Search ...................... 361/100, 79, 86, 87, 361/88, 90, 91; 363/124, 138, 135, 54, 56, 57, 50, 52; 307/252 M, 252 J; 323/17, 22 SC, DIG. 1

[56] References Cited

U.S. PATENT DOCUMENTS

| | | | |
|---|---|---|---|
| 3,555,399 | 1/1971 | Buchanan et al. | 363/124 X |
| 3,629,615 | 12/1971 | Gurwicz | 363/124 X |
| 3,659,119 | 4/1972 | Kasama et al. | 363/124 X |
| 3,821,630 | 6/1974 | Kornrumpf et al. | 363/57 |

Primary Examiner—Patrick R. Salce
Attorney, Agent, or Firm—Donald J. Ellingsberg

[57] ABSTRACT

A commutation sensor circuit for a DC-to-DC silicon controlled rectifier (SCR) chopper circuit to protect against commutation failure by determining the commutation capability of the chopper. This determination is made by testing two conditions, first, the applied voltage is measured and used to predict the commutation voltage available after a main SCR has been gated on and a commutating capacitor charged, and second, the available commutation voltage is measured after the main SCR has been gated on and the commutating capacitor charged. The first test allows the chopper to turn on if the predicted voltage when compared to the current flowing is sufficient to commutate the chopper. The second test initiates a commutation if the current flowing in the chopper reaches the maximum commutating ability of the chopper.

10 Claims, 3 Drawing Figures

COMMUTATION SENSOR CIRCUIT FOR A DC-TO-DC SILICON CONTROLLED RECTIFIER (SCR) CHOPPER CIRCUIT

CROSS-REFERENCE TO RELATED APPLICATION

Copending application: Ser. No. 833,538 filed Sept. 15, 1977 for "DC-TO-DC CHOPPER CIRCUIT," Stanley L. Mann and Charles E. Rettig; assigned to the same assignee as the present invention.

BACKGROUND OF THE INVENTION

Variable frequency inverter power supplies have been improved by the use of current source power supplies. For example, see U.S. Pat. No. 3,863,121 granted Jan. 28, 1975 and assigned to the same assignee as the present invention. Inverters have been built using a phase-controlled rectifier for control purposes. This is a simple, rugged control system that can tolerate abuse and yet continue operation when supplied from alternating current (AC) power mains. This is because the phase control rectifier is commutated by the reversal of the applied AC voltage. If a misfire were to occur, the AC voltage continues reversing in polarity giving the control circuit another opportunity to fire on the next cycle. This can be readily accomplished with the proper sizing of power circuit elements.

Inverters can also be operated from direct current (DC) power mains by use of a chopper. As its name implies, a chopper provides an adjustable magnitude DC voltage by repetitively applying the constant voltage from the DC power main, which can be supplied by a DC battery, for adjustable time intervals so that over a long period the average value of the direct current is at a desired level. However, with a chopper as the controlling element, there is no source of energy for commutation like there is with the phase-controlled rectifier. The chopper depends upon stored energy to turn itself off. If for some reason a misfire occurs, or the stored energy is not enough to turn the chopper off, there is no second chance to commutate as there is with the phase-controlled rectifier. It therefore becomes necessary to determine the commutation ability of the chopper and to prevent miscommutations due to insufficient stored energy.

The prevention of a miscommutation due to insufficient stored energy continues as a recognized need. Before the present invention, the determination of commutation ability has been accomplished by the difficult and more costly sensing of necessary input signals from several circuit junctions, and the reconstruction thereof at another portion or portions of the circuit.

OBJECTS OF THE INVENTION

Accordingly, it is an object of the invention to provide a commutation sensor circuit for a DC-to-DC SCR chopper circuit.

It is an object of the invention to provide a commutation sensor circuit to protect against commutation failure or miscommutation in a DC-to-DC SCR chopper.

It is an object of the invention to provide a commutation sensor circuit to predict and monitor the commutation ability of a DC-to-DC chopper.

It is an object of the invention to provide a commutation sensor circuit to predict and monitor the commutation ability of a DC-to-DC chopper by a simplified circuit having a reduced number of sensing junctions.

It is an object of the invention to provide a commutation sensor circuit where the significant values of signal quantities that are measured are further readily identified.

SUMMARY OF THE INVENTION

Briefly, in accordance with one form of the invention, a commutation sensor circuit for a DC-to-DC chopper circuit is provided having first sensor means sensing an applied DC voltage as the available commutation voltage. A first control means compares the available commutation voltage to the actual output of the chopper circuit and enables the chopper circuit when available commutation voltage is sufficient to commutate the chopper circuit. A second sensor means senses the commutation voltage in the chopper circuit after the first control means enables and a chopper controller initiates the chopper cycle. A second control means compares the chopper circuit commutation voltage to the actual output and initiates commutation before the output exceeds the maximum commutating ability of the chopper circuit which overrides the controller and its normal control of the chopper.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
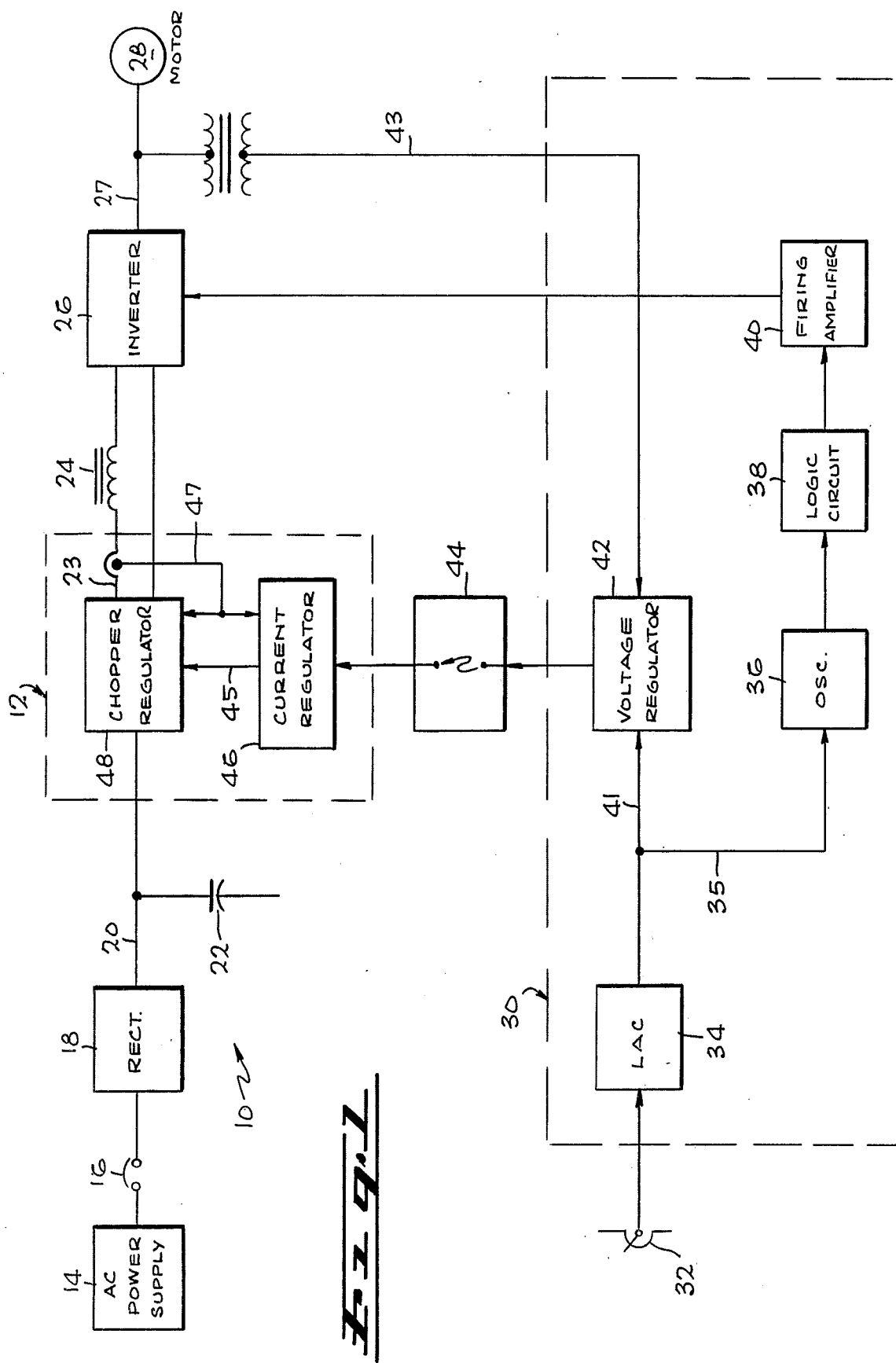
FIG. 1 is a schematic diagram of one embodiment of the commutation sensor circuit of the present invention for a DC-to-DC SCR chopper.

FIG. 1 is a simplified block diagram of one motor drive 10 where the commutation sensor circuit 12, including a DC-to-DC chopper circuit, of the invention can be used. AC power is applied through a circuit breaker 16 to a rectifier 18 where the AC power is rectified to provide an unregulated DC power on DC bus 20. A ripple filter 22 provides a low impedance source for a RMS ripple current that enhances proper chopper operation and reduces line disturbance. The chopper circuit included here for purposes of description with the commutation sensor circuit 12 of FIG. 1 draws unregulated DC power from the DC bus 20 and provides a regulated output through positive conductor 23 to a DC link choke 24. It is contemplated that at least one such regulated output can be a unidirectional output; for example, a DC output current. The chopper as described in our cross-referenced copending application can be considered as an on-off, solid state switch with the regulated output equal to the unregulated DC bus voltage or zero. However, the chopper switches at such a rapid rate, for example 600 Hz, that the DC link choke 24 filters the DC current output of the chopper to a relatively smooth DC level. The smoothed, unidirectional output of the DC choke 24 is delivered to an inverter 26 where it is switched from phase to phase at a desired frequency and supplied through conductor 27 to a load, such as an AC motor load 28. A control portion 30 of the motor drive 10 of FIG. 1 receives a selected frequency reference that is set by reference potentiometer 32 and used as a frequency signal and a voltage reference. An adjustable linear acceleration circuit (LAC) 34 controls the rate at which the frequency signal is applied to the control circuits within the control portion 30. When used as a frequency signal, the LAC output in conductor 35 is used to generate a pulse train by a voltage controlled oscillator 36. This pulse train is then decoded by a logic circuit 38 which generates gate pulses that are amplified by a firing amplifier 40 and applied to the inverter 26. When used as a voltage reference, a voltage regulator 42 compares the LAC output signal in conductor 41 to an isolated voltage feedback signal in conductor 43. The difference between these compared signals is amplified, compensated, and fed as a current command or reference signal to an optical isolator 44 to a current regulator 46 in the chopper circuit 12. The current regulator 46 compares the current reference signal with a current feedback signal supplied through conductor 47 and develops a logic level, variable duty cycle waveform. This waveform controls the normal firings of the chopper 48 thus regulating the DC current and thereby maintaining the desired output voltage supplied to motor 28 by motor drive 10.

In our noted copending application to which reference is made, we disclose a DC-to-DC chopper circuit to control or regulate at least the current supplied, for example, to a current-source inverter. While we conceived the invention disclosed in the copending application and the present invention simultaneously, the present invention is directed to the commutation sensor circuit for such a chopper and is not directed specifically to the chopper although the chopper is shown by FIG. 2 and is described hereinafter for the purpose of a clear understanding of our present invention.

Figure 2:
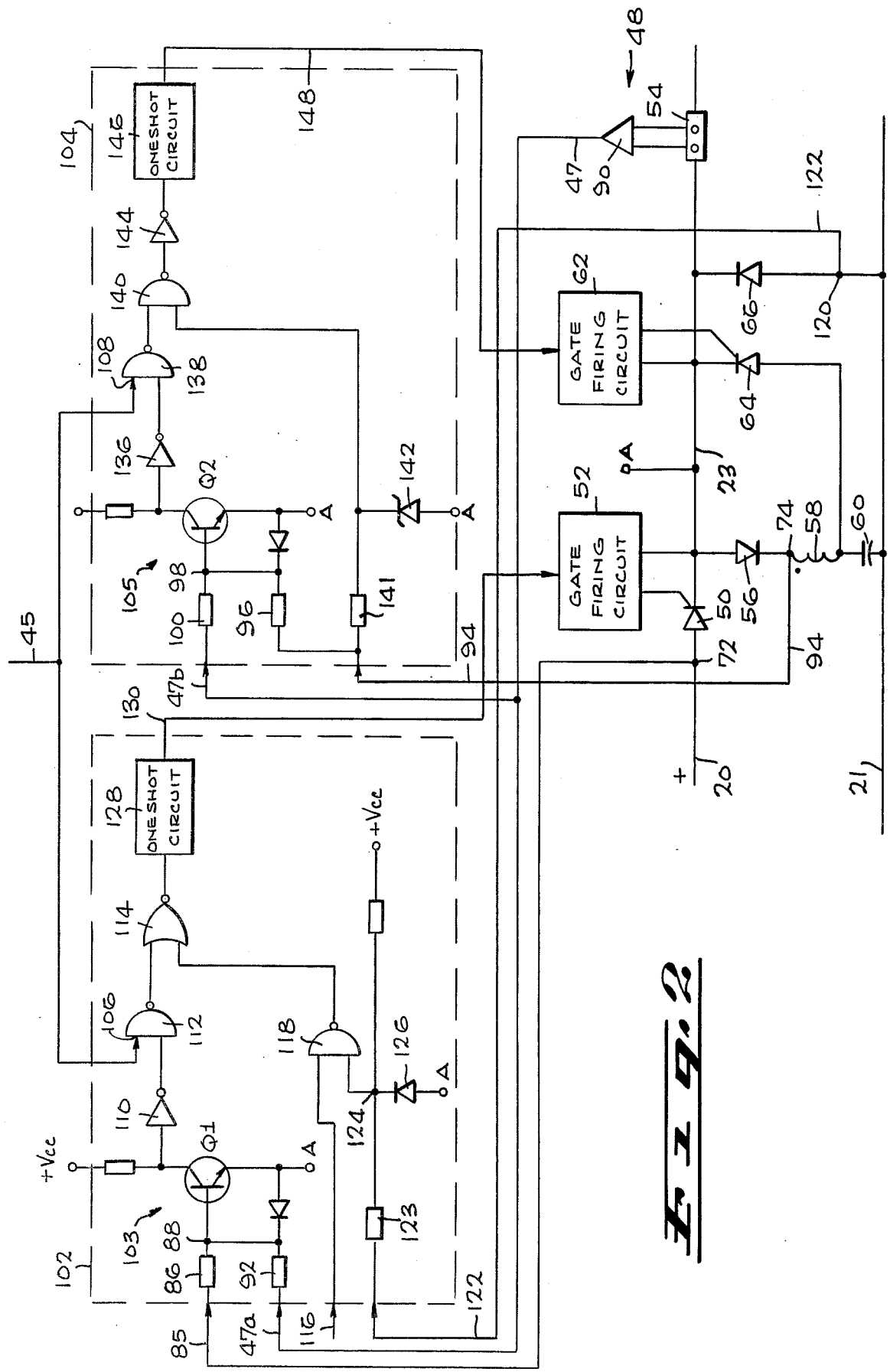
FIG. 2 is a detailed schematic diagram of the embodiment of FIG. 1.

Referring to FIG. 2, the chopper circuit 48 draws unregulated DC power from positive DC bus 20 through a main silicon controlled rectifier (SCR) 50 when a gate firing circuit 52 in the chopper gates or turns on SCR 50. SCR 50 provides an output current through shunt 54, which is part of the chopper 48, to the positive conductor 23. The chopper 48 derives its stored energy from a resonating circuit that consists of a charging diode 56 and reactor circuit. The reactor circuit has an inductor 58 and a commutating capacitor 60 that are connected in series across negative conductor 21 and the positive conductor 23 with the anode of diode 56 at the same electrical potential as the cathode of main SCR 50. The charging diode 56 applies voltage from the positive conductor 23, when main SCR 50 is gated on, to the reactor circuit that resonates in a conventional manner and increases the applied voltage on capacitor 60 to approximately twice the supplied unregulated DC voltage. This voltage is trapped on the capacitor 60 when the charging diode 56 becomes reverse biased and stops conducting.

The main SCR 50 will continue to provide an output current to the DC link choke 24 of FIG. 1 until the main SCR is returned to an off or nonconducting mode. At that time, gate firing circuit 62 turns on a commutating SCR 64. SCR 64 is connected with it anode intermediate inductor 58 and capacitor 60 and its cathode at the same potential as the cathode of the main SCR 50. Commutating SCR 64 applies the stored voltage of capacitor 60 to the main SCR 50 in a reverse polarity for a determinable period of time to reverse bias the main SCR into an off or nonconducting mode. Since the current flowing in the DC link choke 24 cannot stop instantaneously, it continues to flow through capacitor 60 and SCR 64 until the commutating capacitor is discharged. At this point, a freewheeling diode 66 becomes forward biased and begins to conduct, allowing the DC current to continue to flow through the DC link choke 24. The freewheeling diode 66 is connected with its cathode at the same potential as the cathodes of the main SCR 50 and commutating SCR 64.

This normal process is repeated at a repetition rate determined by control portion 42 and current regulator 46 of FIG. 1. When the main SCR 50 is turned on, the current supplied by the main SCR will increase to the level that was flowing in the freewheeling path and the charging diode 56 will begin to conduct, while the commutating SCR 64 and freewheeling diode 66 are driven into a nonconducting mode.

During the normal operation of the chopper 48, the current regulator 46 of FIG. 1 determines the firing of the gate firing circuits 52 and 62 of FIG. 2 while the sensing circuits of the chopper 48 as described hereinafter monitor but do not control the chopper cycle. However, abnormal conditions can occur that affect the commutation ability of the chopper and result in miscommutation due to insufficient stored energy. Most chopper circuits derive commutation energy from the unregulated DC bus voltage from which it draws its power. In FIG. 1, the chopper circuit 48 as shown and described hereinafter derives its stored energy from the circuit relationship of the charging diode 56, reactor 58, and the commutating capacitor 60. With the capacitor fully discharged, gating on the main SCR 50, as sensed at junction 72, of FIG. 2 and as shown by the FIG. 3A waveform at time $T_1$, applies a voltage to the reactor circuit equal to the applied bus voltage. This results in a sinusoidal increase in the capacitor voltage to approximately twice the applied voltage as shown by portion 70 of the FIG. 3B waveform. This voltage is trapped on the commutating capacitor 60 when the charging diode 56 becomes reverse biased and stops conducting. Therefore, the stored energy after charging the capacitor can be predicted by measuring the applied voltage across the main SCR 50 as sensed at junction 72 as referenced to point A of FIG. 2 before charging the capacitor. Point A, as circuit common, is selected in the commutation sensor circuit to be at the same electrical potential as that applied to the cathodes of main SCR 50 and commutating SCR 64.

The actual commutation ability of the stored energy is determined by the amount that the captured or stored voltage of capacitor 60 exceeds the unregulated bus voltage delivered to the chopper 48. This is the amount of reverse voltage that is available to be applied to the main SCR 50. To reverse bias SCR 50 into a nonconducting mode, reverse voltage must be applied for a minimum length of time, $t_q$, which is a known constant for a selected SCR. The time that reverse voltage, $t_{rev}$, is applied is determined by:

$$t_{rev} = C\Delta V/I \qquad (1)$$

where
C = capacitance of capacitor 60,
ΔV = difference between capacitor voltage and applied bus voltage, and I = current flowing from the chopper 48 at the time the main SCR 50 is turned off.

When $t_{rev}$ is equal to or greater than $t_q$, main SCR 50 will be turned off. Therefore, the current that can be commutated can be written as:

$$I = C\Delta V / t_{rev} \qquad (2)$$

$$t_{rev} = \geq t_q \qquad (3)$$

$$I = \leq C\Delta V / t_q = K\Delta V \qquad (4)$$

Thus the allowed current is directly proportional to the voltage difference between charged capacitor 60 and the unregulated DC bus as sensed at junction 74 and referenced to point A of FIG. 2.

This difference can be predicted before the capacitor 60 is charged determining the losses in the resonating circuit; for example, by taking 95% of the applied DC bus voltage since the capacitor will swing to about 195% of the applied voltage. This is also the same as the sensed offstate voltage of the main SCR 50 before firing. After charging the capacitor, the difference voltage between the capacitor and the unregulated DC bus is equal to the off-state voltage of the commutating SCR 64.

Figure 3:
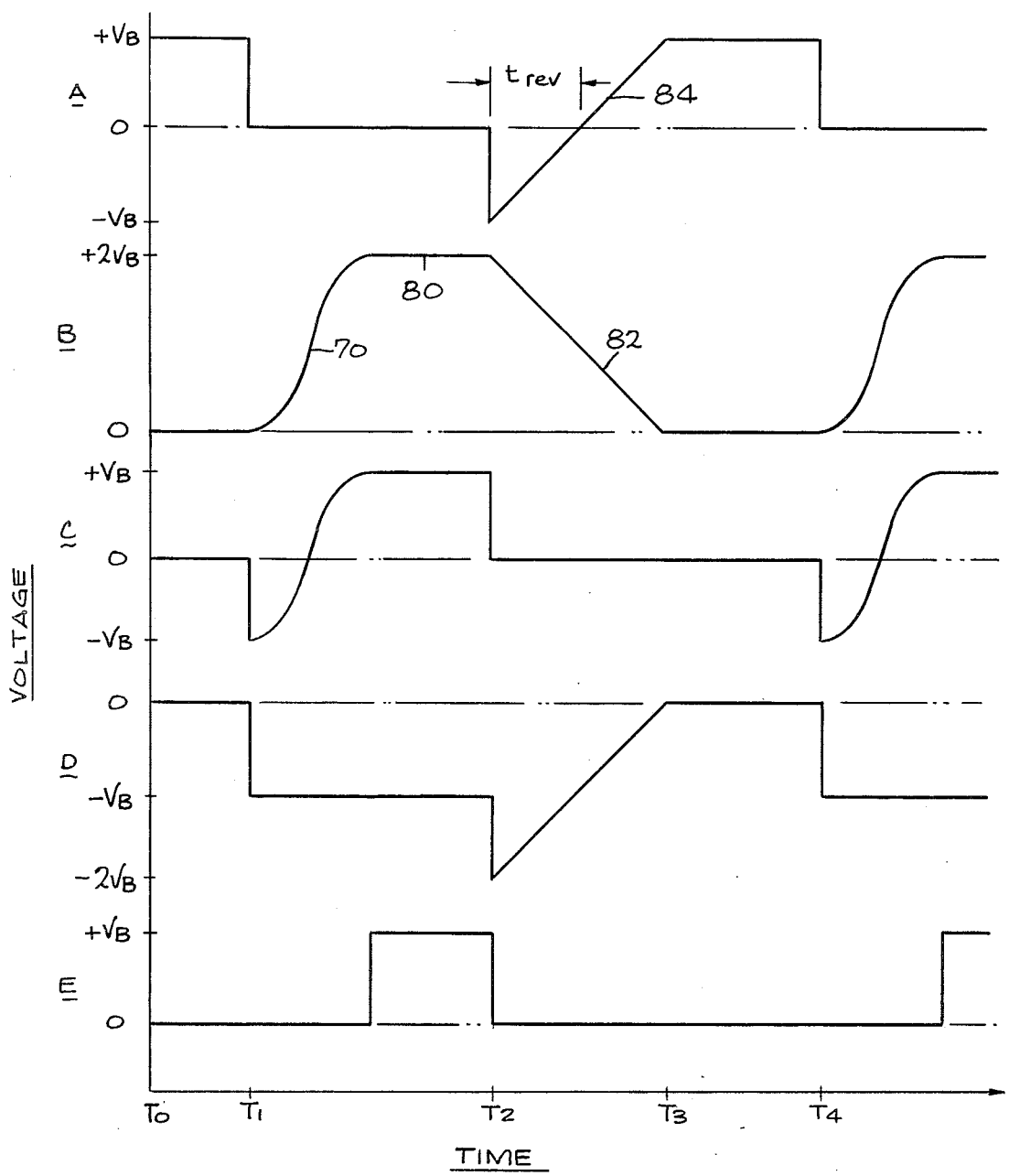
FIG. 3 is a graph of the several waveforms generated by the embodiment of FIGS. 1 and 2.

Referring to the sample waveforms of FIG. 3, the waveforms of FIGS. 3A, 3B, 3C, 3D, and 3E respectively show the applied DC bus voltage across the main SCR 50, the voltage on commutating capacitor 60, the voltage across the commutating SCR 64, the voltage across the freewheeling diode 66, and the voltage at the cathode of the charging diode 56; all as referenced to point A. In FIG. 3A, the main SCR 50 has an applied positive electrical potential that is equal to the voltage of the unregulated DC bus ($+V_B$). The main SCR 50 is in the off or nonconducting mode at time $T_o$. Since the main SCR is not turned on at $T_o$, there is no applied voltage on capacitor 60 and commutating SCR 64 as shown by FIGS. 3B and 3C, respectively. Similarly, the freewheeling diode 66 at FIG. 3D is at zero voltage potential although it is conducting in the freewheeling mode as described hereinbefore. At time $T_1$, the main SCR 50 is gated on and goes to zero potential in its conducting mode. This permits the capacitor 60 at FIG. 3B to experience the previously described sinusoidal increase in the capacitor voltage to approximately twice the applied unregulated DC bus ($+2V_B$). The anode of the commutating SCR 64 sees the sinusoidal increase in voltage on capacitor 60 as a related increase in applied voltage that changes the applied potential from a negative value equal to the applied unregulated DC bus ($-V_B$) to an approximately equal but positive value ($+V_B$). Since the cathodes of the main SCR 50 and the commutating SCR 64 are at the same potential, the commutating SCR is reverse biased at time $T_1$ of FIG. 3C into the off or nonconducting mode, and the freewheeling diode 66 at time $T_1$ of FIG. 3D is similarly driven into a nonconducting mode. The main SCR 50 continues to supply load current as the regulated DC output of the chopper. After capacitor 60 reaches the voltage level of approximately $+2V_B$, it holds at this voltage level as indicated by portion 80 of the waveform of FIG. 3B for a determinable or selected period of time. At time $T_2$, the cummutating SCR 64 is turned on and goes to zero voltage potential in its conducting mode as shown by FIG. 3C. When commutating SCR 64 is fired at time $T_2$, the voltage on capacitor 60 is applied across the bus and the capacitor discharges in a linear manner as indicated by slope portion 82 of the FIG. 3B waveform. Capacitor 60 will discharge at a rate proportional to the current which is a basic characteristic of a capacitor. This discharge of capacitor 60 places a reverse voltage on the main SCR 50 as indicated by slope portion 84 of the FIG. 3A waveform. In accordance with the equations set forth hereinbefore, main SCR 50 is reverse biased into a nonconducting mode by the application of reverse voltage for at least a minimum length of time $t_q$. Since the time of the applied reverse voltage $T_{rev}$ is selected to be equal to or greater than $t_q$, main SCR is turned off and returns to the applied positive electrical potential ($+V_B$) at time $T_3$. As the capacitor 60 discharges along slope portion 82, it starts to go through zero voltage but is suitably clamped at zero volts. This results in forward biasing the freewheeling diode 66 and it starts conducting so that the current that was established while the main SCR 50 was on continues to freewheel until time $T_4$. Time $T_4$ is equivalent to time $T_1$ and the process repeats at a controlled repetition rate.

Consideration can now be given to a description of the chopper circuit 48 of FIG. 2 both when normal operating conditions are experienced and when abnormal operating conditions are experienced; the latter of which could adversely affect the operation of the chopper.

Under normal conditions, the sensed voltage across the main SCR 50 of FIG. 2 in the freewheeling mode as described hereinbefore and represented by the waveform of FIG. 3A is used to derive the applied DC bus voltage. The applied voltage is proportional to the current sensed at junction 72 by commutation sensor subcircuit 103 as sampled through conductor 85 by resistor 86 to summing node 88 as a positive current. The current output of the chopper 48 is detected by shunt 54, amplified by amplifier 90, and sampled through conductor 47a by resistor 92 to summing node 88 as a negative current. If the relationship of Equation (4) as described hereinbefore is satisfied, that is, if the positive current sampled by resistor 86 is larger than the negative current sampled by resistor 92, the summed current from node 88 to the base of transistor Q1 is positive and transistor Q1 is on so that the main SCR 50 is gated on in a normal manner by gate firing circuit 52 when the current regulator 46 demands. However, if Equation (4) is not satisfied, that is, if there no longer is an excess of positive current at the base of transistor Q1 and the base therefore goes negative, transistor Q1 turns off and main SCR can not be gated on until the equality of Equation (4) is satisfied.

After the normal charging of commutating capacitor 60 is completed, no current flows in reactor 58 and its voltage goes to zero so that the cathode of charging diode 56 and the anode of commutating SCR 64 are at the same potential. The waveform of FIG. 3E reflects this positive potential that is sensed at junction 74. The positive potential sensed at junction 74 is sampled through conductor 94 by resistor 96 as a positive current input to summing node 98 which is again compared to the negative current sampled through 47b by resistor 100. If the equality condition as defined by Equation (4) is satisfied at summing node 98, the base of transistor Q2 experiences an excess of negative current and turns off which overrides the control portion regulated demand and enables gate firing circuit 62 to fire commutating SCR 64. So that transistor Q2 does not incorrectly interpret the voltage at junction 74 during the charging of capacitor 60, this voltage is sensed by NAND 140 as described hereinafter. NAND 140 blocks any signal from the transistor sensor $Q_2$ until the voltage level reaches the commutation voltage level indicated by portion 80 of the FIG. 3B waveform. Resistor 141 and zener diode 142 serve to limit the input signal to NAND 140 to a safe level. The trapped voltage on capacitor 60 is applied across the bus as described hereinbefore and main SCR 50 is reverse biased into a nonconducting mode. In summary, with the cathodes of the main SCR 50, the commutating SCR 64, and the anode of the charging diode 56 at the same electrical potential, the commutation voltage can be readily sensed and a determination made as to commutation ability both before the main SCR is gated on and after the capacitor 60 has been charged, and further to sense the end of the capacitor charging cycle.

The foregoing brief description of the chopper circuit 48 of FIG. 2 when considered in operative detail includes control logic circuits 102 and 104 which have the transistor $Q_1$ in commutating sensor subcircuit 103 and the transistor $Q_2$ in commutating sensor subcircuit 105, respectively. The control signal generated by the current regulator 46 on conductor 45 is high for the chopper on and is low for the chopper off during normal operation.

Under normal operating conditions as described hereinbefore, transistor $Q_1$ is on and its collector voltage is low. The low input to inverter 110 becomes a high output to NAND 112 which, when coupled with the high at input 106, generates a low output from NAND 112. This low output from NAND 112 is fed into one gate of NOR 114. An auxilliary enable signal to input 116 of control logic circuit 102 is high when the current regulator 46 generates the high input to the control logic 102 during normal operation when the transistor $Q_1$ is on or conducting. The high input from 116 is fed to NAND 118 which receives a sensed signal from junction 120 in the chopper regulator 48 through conductor 122 and resistor 123. The reverse voltage of the freewheeling diode 66 sensed at junction 120 is compared with the positive control voltage (+Vcc) of the control logic. As shown by the FIG. 3D waveform, the sensed voltage fed to summing node 124 is normally very negative yet periodically goes to zero where it is clamped by diode 126 referenced to circuit point A. As the sensed signal from junction 120 to summing node 124 becomes less and less negative, the positive control voltage (+Vcc) eventually overcomes the negative potential and the node 124 goes positive. When the positive level at summing node 124 reaches the threshhold of NAND 118, the NAND gate has two high inputs resulting in a low output from NAND 118 that is fed to the second gate of NOR 114. NOR 114 thus has a first low input from NAND 112 and a second low input from NAND 118 whereupon NOR 114 generates a high output. A conventional one-shot multivibrator circuit 128 is conditioned to respond only to a high input whereupon it generates a fixed pulse width output signal on conductor 130 to initiate a firing of the main SCR 50 by the gate firing circuit 52 during normal operation.

The one-shot multivibrator circuit 128 is necessary because the voltage at junction 72 drops to zero when the main SCR 50 is fired as is shown by the FIG. 3A waveform at time $T_1$. This would cause the summing node 88 to go negative and turn transistor $Q_1$ off. When transistor $Q_1$ is off, it inhibits the firing of the main SCR 50 because the collector voltage of transistor $Q_1$ goes high, the output of inverter 110 goes low, the output of NAND 112 goes high, and the output of NOR 114 goes low. Therefore, the pulse width of the NOR gate 114 alone would not be wide enough to affect the desired enabling of the gate firing circuit. The one-shot multivibrator circuit develops the necessary pulse width.

Similarly under an abnormal condition, control logic circuit 102 senses that the equality of Equation (4) is not satisfied and transistor Q1 turns off which inhibits the enabling of gate firing circuit 52 as described.

Under normal operating conditions, transistor Q1 of control logic circuit 102 is on and main SCR 50 accordingly fired as described hereinbefore. Transistor Q2 of control logic circuit 104 will be on after the charging period and commutating SCR 64 will be fired in a normal manner as determined by the current regulator 46 generating a low signal on conductor 45 as an input at 108 of NAND 138. Since the applied voltage is sufficient, transistor Q2 is on and the collector voltage is low which results in a low input to inverter 136. The output of inverter 136 is therefore high into NAND 138 which, when coupled with the low signal introduced at input 108, results in a high output to the second NAND 140. The other input to NAND 140 as described hereinbefore, brings the voltage on the zener diode 142 to a high or logic 1 state. This high input to NAND with the high input from NAND 138 enables NAND 140 to generate a low output to inverter 144. Inverter 144 generates a high output to a one-shot multivibrator circuit 146, which is functionally and structurally similar to the one-shot multivibrator circuit 128 of control logic 102, that responds to the high input whereupon it generates a fixed pulse width output signal on conductor 148 to initiate a firing of the commutating SCR 64 by the gate firing circuit 62 during normal operation.

Under an abnormal condition with the main SCR 50 conducting and the current through shunt 54 increasing, the negative current feedback signal into summing node 98 becomes larger than the positive signal from conductor 94 which turns off transistor Q2 so that its collector voltage goes high. This results in a high input to inverter 136, the output of NAND 138 goes high which initiates the firing sequence for the commutating SCR 64 so that the main SCR 50 is reverse biased off and the abnormal condition countered.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A commutation sensor circuit for a DC-to-DC chopper circuit connected between a source of applied DC voltage and regulated output where the chopper circuit receives a command signal representative of a desired regulated output and where the chopper circuit includes a controller that compares the command signal to the actual regulated output, the commutation sensor circuit comprising:

(a) a circuit common providing a circuit reference of known electrical potential, (b) first sensor means referenced to said circuit common sensing the applied DC voltage as the available commutation voltage, (c) first control means comparing said available commutation voltage to the actual regulated output and enabling the chopper circuit when said available commutation voltage is sufficient to commutate the chopper circuit, (d) second sensor means referenced to said circuit common sensing the commutation voltage in the chopper circuit after said first control means enables the chopper circuit and the controller initiates the chopper cycle, and (e) second control means comparing said chopper circuit commutation voltage to the actual output current and initiating commutation by the chopper circuit at least when said output current equals the maximum commutating ability of the chopper circuit thereby overriding the controller of the chopper circuit.

2. The commutation sensor circuit of claim 1 further comprising a shunt sensor means responsive to the regulated output generating a corresponding feedback signal for said first control means and said second control means.

3. The commutation sensor circuit of claim 2 in which the DC-to-DC chopper circuit includes a main silicon controlled rectifier (SCR) with its anode at the same electrical potential as said first sensor means and a commutating SCR with its anode at the same electrical potential as said second sensor means the cathodes of each of said SCRs at the same electrical potential as said circuit common, said first sensor means responsive to the applied voltage across the main SCR generating a corresponding applied voltage signal as the available commutation voltage.

4. The commutation sensor circuit of claim 3 in which said first control means is resonsive to said applied voltage signal as the available commutation voltage and to said feedback signal as the actual regulated output, said first control means enabling said main SCR in the chopper circuit.

5. The commutation sensor circuit of claim 3 in which the DC-to-DC chopper circuit further includes a stored energy means at the same electrical potential as the anode of the commutating SCR trapping an applied and increased commutation voltage.

6. The commutation sensor circuit of claim 5 in which said second sensor means is responsive to said electrical potential on the commutating SCR anode generating a corresponding available commutation voltage signal.

7. The commutation sensor circuit of claim 5 in which said stored energy means includes a series-connected diode, inductor and capacitor where the cathode of said diode is at the same electrical potential as the anode of the commutating SCR, and the inductor and capacitor increasing the applied DC voltage.

8. The commutation sensor circuit of claim 6 in which said second control means is responsive to said available commutation voltage signal and to said feedback signal, said second control means enabling said commutating SCR in the chopper circuit to initiate said commutation.

9. The commutation sensor circuit of claim 2 in which said first control means includes a first commutating sensor means comparing said avialable commutation voltage and said feedback signal, and generating said enabling signal.

10. The commutation sensor circuit of claim 2 in which said second control means includes a second commutating sensor means comparing said chopper circuit commutation voltage and said feedback signal, and generating said initiating signal.

* * * * *